Figure 1:
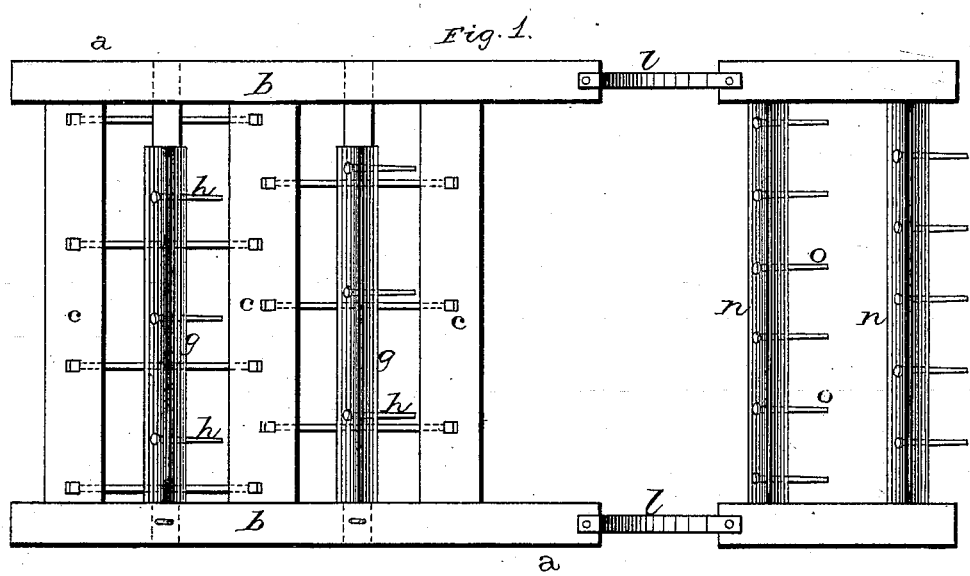
Figure 2:
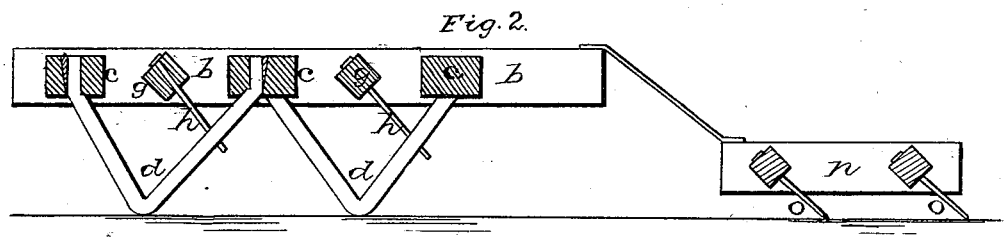
Figure 3:

S. B. SMITH & A. B. McCULLEY.
Harrow

No. 201,363.      Patented March 19, 1878.

WITNESSES.
J. Wm Garner
William S. D. Haines

INVENTORS
A. B. McCully
S. B. Smith,
per
J. A. Lehmann,
Atty.

UNITED STATES PATENT OFFICE.

SIDNEY B. SMITH, OF EMINENCE, KENTUCKY, AND ALLISON B. McCULLEY, OF DECATUR COUNTY, TENNESSEE.

IMPROVEMENT IN HARROWS.

Specification forming part of Letters Patent No. 201,363, dated March 19, 1878; application filed December 21, 1877.

*To all whom it may concern:*

Be it known that we, SIDNEY B. SMITH and ALLISON B. McCULLEY, the former of Eminence, Henry county, Kentucky, the latter of Decatur county, Tennessee, have invented certain new and useful Improvements in Harrows; and we do hereby declare the following to be a full, clear, and exact description of the invention, such as will enable others skilled in the art to which it pertains to make and use it, reference being had to the accompanying drawings, which form part of this specification.

Our invention relates to an improvement in harrows; and it consists in the arrangement and combination of parts that will be more fully described hereinafter, whereby a cheap, simple, and effective harrow is produced.

The accompanying drawings represent our invention.

*a* represents the frame, which is composed of two side bars, *b*, and the three cross-bars *c*. Passing up through these cross-bars from the under sides are the upper ends of the V-shaped teeth *d*, which teeth have their upper ends fastened by means of keys or nuts, as may be preferred, so that the teeth can be readily removed. These teeth are made V-shaped, as here shown, and sharpened upon their lower ends and outer edges, so as to cut readily through the sod without imposing too great a draft upon the team drawing the harrow. When one edge of these teeth has become dull, they may be reversed, so as to present the other edge.

It will be noticed that the teeth are placed staggering, instead of one behind the other. This peculiar form of tooth is especially adapted for cutting the sod of meadow-land which has just been plowed, so that the sod will not be in the way in planting corn or other grain.

In between the stationary cross-pieces *c* are the removable cross-beams *g*, which are provided with the straight teeth *h*. These straight teeth extend backward at the same angle as the edges of the V-shaped teeth, and serve to turn over the sod after it has been cut by the V-shaped teeth.

These straight teeth do not extend as low down as the other teeth, so that they will not gather trash, and they also serve to prevent the sod from rising up between the other teeth or cutters. When it is desired not to use these straight teeth in combination with the cutters or V-shaped teeth, they can be readily removed.

Attached to the rear end of the harrow, by means of straps, chains, or other equivalent devices, *l*, is the drag *n*, which is provided with straight rearwardly-inclined teeth *o*. This drag is used for harrowing in small grain of all kinds. If so desired, the drag may be turned bottom side up, instead of having the teeth project downward.

A harrow constructed as above described is not only very cheap and simple, but, owing to the shape of teeth, it will perform its work much more readily, and with less draft upon the horses than almost any other.

Having thus described our invention, we claim—

In combination with a harrow provided with V-shaped teeth, the removable cross-bars provided with the straight teeth, substantially as shown and described.

In testimony that we claim the foregoing we have hereunto set our hands this 24th day of November, 1877.

SIDNEY B. SMITH.
A. B. McCULLEY.

Witnesses:
THOMAS W. SMITH,
NEWTON BRIGHT,
ROBERT SHANNON,
J. A. TUCKER.